United States Patent [19]

Schnell

[11] 4,301,185

[45] Nov. 17, 1981

[54] STABILIZATION OF HEAT SENSITIVE ANTIOXIDANTS

[75] Inventor: Philip G. Schnell, Wheaton, Ill.

[73] Assignee: Standard Oil Company (Indiana), Chicago, Ill.

[21] Appl. No.: 105,392

[22] Filed: Dec. 19, 1979

Related U.S. Application Data

[63] Continuation-in-part of Ser. No. 967,078, Dec. 6, 1978, abandoned.

[51] Int. Cl.$^3$ .................. C12C 11/26; A23L 3/34; A21D 2/08
[52] U.S. Cl. ........................... 426/546; 426/60; 426/544; 426/653; 426/656
[58] Field of Search ............... 426/60, 62, 541, 544, 426/545, 546, 656, 653; 435/256

[56] References Cited

U.S. PATENT DOCUMENTS

| | | | |
|---|---|---|---|
| 2,709,657 | 5/1955 | Campbell et al. | 426/544 X |
| 3,440,058 | 4/1969 | Pomper et al. | 426/62 |
| 3,440,059 | 4/1969 | Pomper et al. | 426/62 |
| 3,448,010 | 6/1969 | Pomper et al. | 435/256 |
| 3,644,215 | 2/1972 | Muller | 426/545 |
| 3,758,311 | 9/1973 | Fortmann | 426/97 X |
| 3,852,502 | 12/1974 | Bishov et al. | 426/545 X |
| 4,166,135 | 8/1979 | Chao et al. | 426/60 |

Primary Examiner—David M. Naff
Attorney, Agent, or Firm—Gregory E. Croft; William T. McClain; William H. Magidson

[57] ABSTRACT

Heat labile antioxidants such as butylated hydroxyanisol, butylated hydroxytoluene, propyl gallate and mono-tertiary-butylhydroquinone are stabilized by incorporation onto an inactive yeast (heat-filled) substrate. The yeast acts to prevent volatilization of the antioxidants at temperatures commonly used in food processes, thus enabling the antioxidants to be added to the food formulation prior to thermoprocessing rather than as a subsequent additional step.

14 Claims, No Drawings

STABILIZATION OF HEAT SENSITIVE ANTIOXIDANTS

This application is a continuation-in-part of copendig application Ser. No. 967,078, filed Dec. 6, 1978 now abandoned.

FIELD OF THE INVENTION

This invention relates to methods of stabilizing heat sensitive antioxidants. More specifically, it relates to the use of yeast as a substrate or carrier which acts to stabilize heat sensitive antioxidants, particularly those antioxidants used for food applications.

DESCRIPTION OF THE PRIOR ART

Antioxidants are those substances which are capable of slowing the rate of oxidation in oxidizable materials. In the food industry they are used to prolong the shelf-like or keeping quality of food products, particularly those containing fats. Such antioxidants are usually aromatic compounds which are either phenolic or amine in character. Among the most important synthetic antioxidants which are approved for food uses are butylated hydroxyanisol (BHA), butylated hydroxytoluene (BHT), propyl gallate (PG), trihydroxybutyrephenone (THBP), thiodipropionic acid (TDPA), mono-tertiary-butylhydroquinone (TBHQ), and dilauryl thiodipropionate (DLTDP).

Antioxidants are available both as synthetic compounds and naturally occurring substances. For food uses, it has been considered desirable in past years to use those antioxidants occurring in nature, but in more recent years some of the synthetic compounds have been favored because of their excellent antioxidant qualities. In selecting an antioxidant for a particular food use, certain features typically must be considered. For example, a suitable antioxidant (1) must not impart undesirable flavor or other characteristics to the system in which it is used; (2) it must be convenient to use; (3) it must be safe to handle; (4) it must be low in cost; and (5) it must be effective in low concentration.

In addition, however, it is desirable for an antioxidant to be able to withstand the thermal conditions present during food processing and still retain its effectiveness. Although natural antioxidants tend to be heat stable, synthetic antioxidants such as BHA, BHT, and TBHQ, for example, volatilize at temperatures below those used during heat processing. Such antioxidants cannot withstand thermoprocessing conditions used for such products as snacks, baked goods, and meats, which use temperatures typically in the range from 200°-400° F. Hence, for purposes herein, a "heat sensitive antioxidant" is one which is unstable or volatilizes at temperatures in the range of about 200°-400° F. so as to reduce its effectiveness in foods prepared by thermoprocessing. In such instances the antioxidant must be applied as an additional step after thermoprocessing. In the case of snacks, for example, the antioxidant is commonly sprayed onto the snack food after processing. This necessitates additional process equipment which is expensive. It would be desirable in many applications to simply add the antioxidant to the food formulation along with the other ingredients if the antioxidant could retain its effectiveness after being subjected to subsequent processing.

It is therefore an object of this invention to provide a method for stabilizing heat sensitive antioxidants.

It is a further object of this invention to provide a product which can be added to a food system prior to thermoprocessing and substantially maintain its antioxidative capabilities.

SUMMARY OF THE INVENTION

In one aspect, the invention resides in a method for making an improved antioxidant composition comprising contacting an effective amount of yeast with a heat sensitive antioxidant in a suitable medium and evaporating the medium, thereby incorporating or depositing the antioxidant onto the yeast. It has been unexpectedly found that by following this procedure, an improved antioxidant composition is produced which is relatively more stable to heat than is the antioxidant by itself. For reasons unknown, the yeast has the capability of binding the antioxidant without changing its chemical structure and hence its effectiveness. Although not completely stable to heat, these compositions exhibit substantially greater ability to withstand thermoprocessing than can the antioxidants by themselves.

Although not restricted to any particular group of antioxidants, such as the family of phenolic antioxidants, those antioxidants of particular importance which can advantageously be used in this invention particularly include the synthetic antioxidants, such as BHA, BHT, TBHQ, and PG.

In order to deposit the antioxidant onto the yeast substrate, the antioxidant is preferably first solubilized in any solvent which is suited for the particular application. The specific solvent will particularly depend on the antioxidant used, and in the case of food systems, must either be acceptable for food use or be capable of total removal from the resulting antioxidant composition. Ethanol is a suitable solvent for several of the antioxidants and also is acceptable in foods. Water will work well for TBHQ, and a water hexane mixture will work well for BHA. However, all of the hexane must be removed for food use. It is not absolutely necessary that the antioxidant be dissolved in a solvent medium. Other means, such as suspension in a suitable medium, can also be used to deposit the antioxidant onto the yeast if the antioxidant will adhere to the yeast.

Any inactive yeast (heat-killed) can be used to achieve at least some degree of success in producing the heat-stable properties characteristic of the antioxidant compositions of this invention, but *Saccharomyces cerevesiae, Kluyveromyces faragilis,* and *Candida utilis* are particularly advantageous since they are currently acceptable for food use. The amount of yeast to be added to the antioxidant-containing medium is dependent upon the desired end use of the resulting composition. To be taken into account are the level of antioxidant desired (or permitted) in the end-use product, the level of yeast which would be acceptable in the end-use product, the degree of thermoprocessing to which the antioxidant composition will be subjected (which affects the amount of antioxidant loss), and the concentration of the antioxidant in the medium. Those skilled in the art will readily determine, without undue experimentation, the effective amount of yeast to be added to carry a sufficient amount of the antioxidant for the particular application at hand. As a general guideline, a weight ratio (dry basis) of antioxidant to yeast can advantageously be from about 0.15 to about 1.2 and preferably not more than about 0.8. Weight ratios greater than 1.2 can also be used but with less efficiency. It should be noted that the yeast and antioxidants can be combined in a variety of ways to suit the situation. For instance, during the yeast production, the antioxidant can be added to the live yeast cream, which can be pasteurized and spray-dried to incorporate the antioxidant onto the yeast product. As an alternative method, spray-dried inactive yeast can be slurried in a suitable solvent with the antioxidant(s) and thereafter dried to deposit the antioxidant(s) onto the yeast. In each case, however, the final yeast-antioxidant composition is inactive.

Evaporation of the medium from the yeast-antioxidant slurry acts to incorporate the antioxidant onto the yeast cell. The mechanism by which the yeast cell bonds the antioxidant is not understood, but the effectiveness of the bound antioxidant does not appear to be impaired. The evaporation can be accomplished by any suitable method, including the use of vacuum or heat, preferably a combination of both.

In a further aspect, the invention resides in any antioxidant composition produced by the abovesaid method.

In a still further aspect, the invention resides in the addition of one or more synthetic antioxidants which are deposited on a yeast substrate to a food or a process for preparing a food.

It will be appreciated that there is no limitation on the type of food to which the process and compositions of this invention can be applied.

EXAMPLES

The following examples will serve to illustrate the invention in more detail.

Sugar cookies were prepared which contained varying amounts of two commonly used antioxidants, propyl gallate (PG) and butylated hydroxyanisol (BHA) (Control). Similar cookies were prepared which contained the same initial amounts of the antioxidants, but which antioxidants had first been incorporated onto an inactive yeast substrate (Yeast Test Product) according to the process of this invention. After baking, the cookies were analyzed for the presence of the specific antioxidants in question and the Controls were compared with the Yeast Test Products.

In order to prepare the Yeast Test Product, the desired amount of the antioxidant was dissolved at room temperature in 38 ml. of ethanol. To this solution was added 100 grams of inactive, spray-dried *Candida utilis* yeast. The resulting slurry was subjected to a vacuum at room temperature to evaporate the ethanol.

The weight ratio of the antioxidant to the yeast is not critical and is only determined by the amounts of each which are desired in the final food application. Generally speaking, yeast levels do not exceed about 5 weight percent due to the yeasty flavor imparted by higher levels. Likewise, the levels of antioxidants permissible by FDA regulations limit the amount of antioxidant allowed in the final product. Those skilled in the art will readily achieve appropriate relative amounts of antioxidant and yeast for their particular food application without undue experimentation.

The cookies for the comparative tests were prepared using the following ingredients:

| Ingredients | Percent by Weight | |
|---|---|---|
| | Control | Test |
| Cake flour | 26.83 | 26.83 |
| Bread flour | 26.83 | 26.83 |
| Shortening | 24.40 | 24.40 |
| Sugar | 11.20 | 11.20 |
| Egg, whole, dry* | 2.20 | 0.59 |
| Corn syrup | 2.10 | 2.10 |
| Vanilla | 0.69 | 0.69 |
| Salt | 0.35 | 0.35 |
| Water | 5.40 | 5.40 |
| Yeast Test Product | — | 1.61 |
| | 100.00 | 100.00 |

*The percentage of egg in the Control differs from the Test samples since the Yeast Test Product partially replaced the egg in the Test samples.

All of the ingredients, except the flour, were blended into a smooth paste. The flour was separately sifted and added to the paste mixture. The entire mixture was folded until smooth and refrigerated until the resulting dough became firm. The dough was then rolled out in a sheet about ¼ inch thick. The cookies were cut out and baked in an oven at 385° F. for about 10 minutes or until they were golden brown. The cookies were then analyzed for the specific antioxidant used in the formulation. (The antioxidants in the Control samples were added with the dried egg when making the dough.) The results are summarized in the following TABLE.

TABLE
Effect of Yeast on the Retention of Antioxidants Through Sugar Cookie Baking Process

| Sample | Retention of Antioxidant After Baking (ppm)* |
|---|---|
| Control (50 ppm PG) | 0 |
| Yeast + 50 ppm PG | 12 |
| Control (100 ppm PG) | 33 |
| Yeast + 100 ppm PG | 46 |
| Control (50 ppm BHA) | 39 |
| Yeast + 50 ppm BHA | 69 |
| Control (100 ppm BHA) | 26 |
| Yeast + 100 ppm BHA | 109 |

*The analysis was performed for the presence of the specific antioxidant involved. Apparent discrepancies are due to analytical error. In every case, however, the yeast sample shows substantially greater retention of antioxidant.

These results clearly show the advantage of depositing the antioxidant on a yeast substrate prior to subjecting the antioxidant to high temperature. Similar results can be obtained with the other antioxidants previously mentioned. Such antioxidant-on-yeast compositions can be used in any foodstuff and are not restricted to cookies or baked foods.

It will be apparent that many variations can be made from these examples, shown for purposes of illustration, without departing from the scope of this invention which is defined by the following claims.

I claim:

1. An improved antioxidant composition for slowing the rate of oxidation of oxidizable material in a food product comprising a heat sensitive antioxidant deposited on a heat-killed dried yeast, said heat sensitive antioxidant being unstable or volatile at temperatures in the range of from about 200° to about 400° F., said antioxidant being deposited on said yeast in an amount sufficient to slow the rate of oxidation of oxidizable material in a food product when said composition is added to the food product.

2. The composition of claim 1 wherein the weight ratio of the heat sensitive antioxidant to the yeast is no greater than about 1:2.

3. The composition of claim 1 wherein the weight ratio of the heat sensitive antioxidant to the yeast is from about 0.15 to about 1.2.

4. The composition of clam 1 wherein the heat sensitive antioxidant is a phenolic antioxidant.

5. The composition of claim 1 wherein the heat sensitive antioxidant is a synthetic antioxidant selected from the group consisting of butylated hydroxyanisol, butylated hydroxytoluene, propyl gallate, and mono-tertiary-butylhydroquinone.

6. The composition of claim 5 wherein the yeast is selected from the group consisting of *Candida utilis, Saccharomyces cerevisiae, Saccharomyces carlsbergensis,* and *Kluyveromyces fragilis.*

7. The composition of claim 5 wherein the yeast is *Candida utilis.*

8. A method for making an improved antioxidant composition for slowing the rate of oxidation of oxidizable material in a food product comprising suspending or solubilizing in a suitable medium a heat sensitive antioxidant which is unstable or volatile at temperatures in the range of from about 200° to about 400° F., adding heat-killed dried yeast to the medium in an amount sufficient to carry the antioxidant, and evaporating the medium to deposit the antioxidant onto the yeast, said antioxidant being deposited on said yeast in an amount sufficient to slow the rate of oxidation of oxidizable material in a food product when said composition is added to the food product.

9. The method of claim 8 wherein the antioxidant is dissolved in an ethanol-containing solvent.

10. The method of claim 9 wherein the antioxidant is selected from the group consisting of butylated hydroxyanisole, propyl gallate, and a mixture thereof.

11. The method of claim 8 wherein the weight ratio of the antioxidant to the yeast is from about 0.15 to about 1.2.

12. The method of claim 11 wherein the yeast is *Candida utilis.*

13. A food product containing the improved antioxidant composition of claim 1.

14. A method for preparing a food product comprising the addition of the improved antioxidant composition of claim 1 to ingredients for preparing said food product.

* * * * *